(12) United States Patent
Chen et al.

(10) Patent No.: US 9,472,957 B2
(45) Date of Patent: Oct. 18, 2016

(54) NON-CONTACT TRANSFORMER SYSTEM

(75) Inventors: Chun-Chen Chen, Taoyuan County (TW); Po-Ching Yu, Taoyuan County (TW); Wei-Chun Chang, Taoyuan County (TW)

(73) Assignee: PHIHONG TECHNOLOGY CO., LTD., Taoyuan County (TW)

( * ) Notice: Subject to any disclaimer, the term of this patent is extended or adjusted under 35 U.S.C. 154(b) by 968 days.

(21) Appl. No.: 13/617,319

(22) Filed: Sep. 14, 2012

(65) Prior Publication Data

US 2014/0028106 A1   Jan. 30, 2014

(30) Foreign Application Priority Data

Jul. 25, 2012   (TW) .............................. 101126875 A (51) Int. Cl.
*H02J 5/00* (2016.01)
*H01F 38/14* (2006.01)

(52) U.S. Cl.
CPC ............... *H02J 5/005* (2013.01); *H01F 38/14* (2013.01)

(58) Field of Classification Search
CPC ................................ H02J 5/005; H01F 38/14
USPC .......................................................... 307/104
See application file for complete search history.

(56) References Cited

U.S. PATENT DOCUMENTS

| | | | | |
|---|---|---|---|---|
| 5,940,282 A | * | 8/1999 | Oglesbee | ................ H02M 1/10 307/151 |
| 2004/0218410 A1 | * | 11/2004 | Yamada | .................. H02M 1/36 363/125 |

* cited by examiner

*Primary Examiner* — Thienvu Tran
*Assistant Examiner* — David M Stables
(74) *Attorney, Agent, or Firm* — Muncy, Geissler, Olds & Lowe, P.C.

(57) ABSTRACT

A wireless transformer system comprises a primary side of AC/DC converter with power factor correction and a secondary side of a half bridge resonant DC/DC converter to power a device wirelessly.

6 Claims, 9 Drawing Sheets

NON-CONTACT TRANSFORMER SYSTEM

FIELD OF THE INVENTION

The invention is relevant to a transformer system, especially a non-contact transformer system.

DESCRIPTION OF THE PRIOR ART

The power factor of an electrical power system is defined as the ratio of the real power flowing to the load to the apparent power in the circuit. An electrical power system with the higher power factor can save the energy lost in the distribution.

In an electric power system, a load with a low power factor draws more current than a load with a high power factor for the same amount of useful power transferred. The higher currents increase the energy lost in the distribution system, and require larger wires and other equipment. Because of the costs of larger equipment and wasted energy, electrical utilities will usually charge a higher cost to industrial or commercial customers where there is a low power factor.

Linear loads with low power factor (such as induction motors) can be corrected with a passive network of capacitors or inductors. Non-linear loads, such as rectifiers, distort the current drawn from the system. In such cases, active or passive power factor correction may be used to counteract the distortion and raise the power factor. The devices for correction of the power factor may be at a central substation, spread out over a distribution system, or built into power-consuming equipment.

An electric power system with power factor correction can improve energy efficiency and save the cost of the electricity. The power factor correction is the environmental technique to decrease the harmonic effects, which result in the electric power pollution, and benefits the society.

Currently, the non-contact transformer system has many applications, but lacks the function of power factor correction. Therefore, such improvement is required. Moreover, the improvement in the electric equipments with the power factor correction is also required.

SUMMARY OF THE INVENTION

The invention aims to solve the above-mentioned problems.

The invention provides a non-contact transformer system with high power factor and high efficiency, wherein the front stage is the AC to DC converter with power factor correction, and the rear stage is the DC to DC converter with the half bridge resonator. The non-contact transformer system can improve the efficiency of the non-contact transforming, and provide power factor correction. Therefore, the invention can achieve the goal to save energy.

An aspect of the invention provides a non-contact transformer system, comprising a transformer comprising: an electric magnetic interference filter for filtering electric magnetic interference; a bridge rectifier connected to the electric magnetic interference filter; a contact transformer connected to the bridge rectifier, and comprising a primary side inductor and a secondary side inductor for transforming a first current to a second current with high power factor and lowering voltage; a secondary side diode connected to the secondary side inductor in series; a secondary side capacitor connected to an unity of the secondary side inductor and the secondary side diode in parallel; a feedback circuit connected to a high voltage end of the secondary side capacitor; a front stage semiconductor switch connected to the primary side inductor; a controller connected to the feedback circuit and the semiconductor switch, and used for controlling the semiconductor switch to turn on or turn off the primary side inductor according to a signal returned by the feedback circuit.

Another aspect of the invention provides a non-contact transformer system further comprising: a transmitting circuit connected to the transformer and comprising: a half bridge resonator for transforming the second current to a third current, a transmitting inductor for transforming the third current to an electromagnetic energy to transmitting the electromagnetic energy wirelessly, and a feedback circuit with one end connected to a connecting point between the transmitting inductor and a ground capacitor and another end connected to the half bridge resonator; a receiving circuit comprising two receiving inductors for receiving the electromagnetic energy by electromagnetic induction and transforming the electromagnetic energy to a fourth current; and an output circuit connected to the receiving circuit and outputting the fourth current, wherein the half bridge resonator connected to: two rear stage semiconductor switches to form a controlling switch circuit; and a resonant tank comprising: a resonant capacitor connected to the controlling switch circuit; and a resonant inductor connected to the resonant capacitor.

Another aspect of the invention provides a non-contact transformer system, wherein the transmitting inductor of the transmitting circuit is an annular transmitting inductor, and the transmitting circuit further comprises a pole in center of the annular transmitting inductor; and the two receiving inductors of the receiving circuit form an annular receiving inductor, wherein when the annular receiving inductor engages with the pole and overlaps the annular transmitting inductor, the annular receiving inductor receives the electromagnetic energy transmitted by the annular transmitting inductor, wherein a length of the pole is enough to go through both of the annular transmitting inductor and the annular receiving inductor.

The present invention has the following advantages: (a) the ability to be applied in the products with high power output; (b) the improved magnetic field conversion efficiency of the magnetic component; (c) the elongated contact distance between transmitting and receiving; (d) the primary side and secondary side components of the rear stage half bridge circuit can be switched at zero voltage or zero current to enhance the overall circuit efficiency; (e) when used in a lighting equipment, the requirement for connecting terminals between the lamp and the transformer can be eliminated to save energy and protect environment; (f) the ability to be applied in the wet and moist environments because the requirement for the connecting terminals, which will get rusty, can be eliminated.

The present invention also improves the structure of the non-contact magnetic components with the pole of the iron core whose length is enough to go through both of the transmitting coil and receiving coil. The pole of the iron core improves the magnetic field conversion produced by the two coils to improve the induction voltage of the receiving coil in order to achieve high-flux conversion efficiency.

BRIEF DESCRIPTION OF THE DRAWINGS

The primitive objectives and advantages of the present invention will become apparent upon reading the following description and upon reference to the accompanying drawings in which.

DESCRIPTION OF THE PREFERRED EMBODIMENT

Preferred embodiments and aspects of the invention will be described to explain the scope, structures and procedures of the invention. In addition to the preferred embodiments of the specification, the present invention can be widely applied in other embodiments.

The invention provides a non-contact transformer system with a high power factor and power factor correction to improve the non-contact transforming efficiency.

Figure 2:
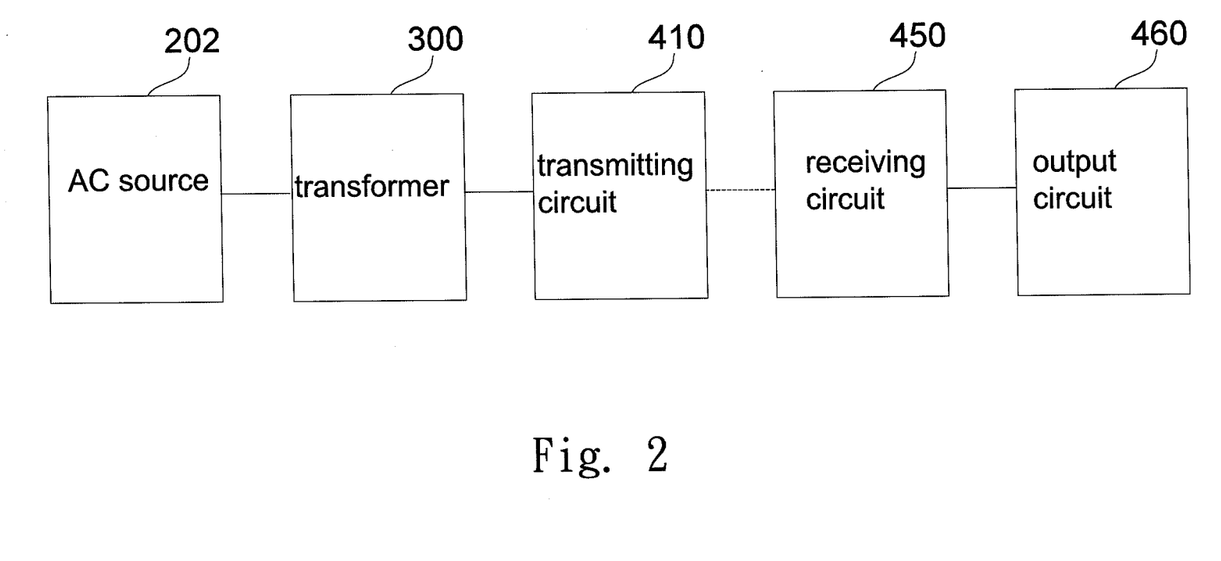
FIG. 2 shows a non-contact transformer system according to an embodiment of the invention.

FIG. 2 shows a non-contact transformer system according to an embodiment of the invention, including: an alternating current source (202), a transformer (300), a transmitting circuit (410), a receiving circuit (450), and an output circuit (460). The alternating current source (202) can be supply mains, and the output circuit (460) can be electric loadings, including chargers, lamps, etc. And, the non-contact interface exists between the transmitting circuit (410) and the receiving circuit (450) to replace wires.

When the invention is used in a lighting equipment, the requirement for connecting terminals between the lamp and the transformer can be eliminated to save energy and protect environment.

Meanwhile, the lighting equipment can be applied in the wet and moist environments because the requirement for the connecting terminals, which will get rusty, is eliminated.

Figure 1:
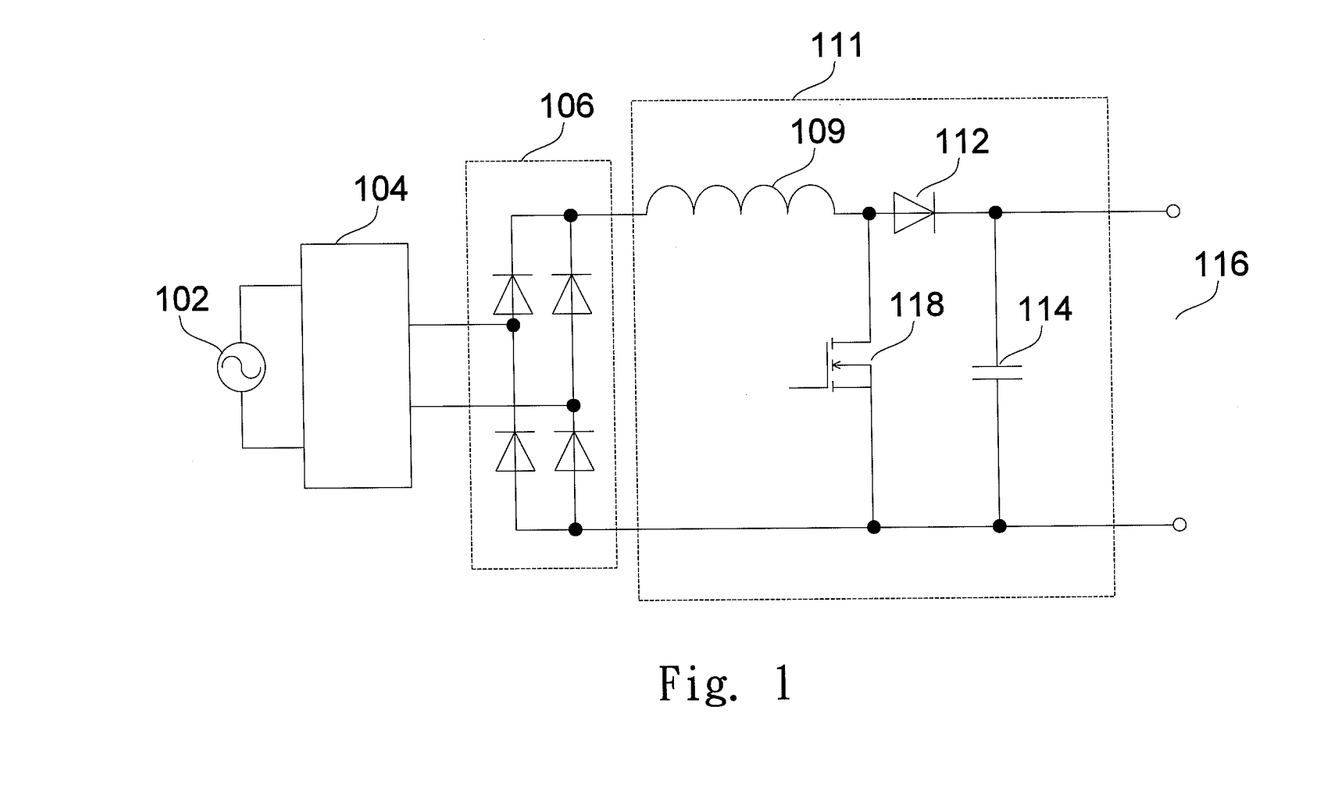
FIG. 1 shows the front stage of the transformer according to an embodiment of the invention.

FIG. 1 shows the front stage of the transformer according to an embodiment of the invention, including: an electric magnetic interference filter (104) for filtering electromagnetic interference; a bridge rectifier (106) connected to the electric magnetic interference filter (104). A power factor correction circuit (111) is connected to the bridge rectifier (106), and includes: an inductor (109); a diode (112) connected to the inductor (109) in series; a capacitor (114); and a semiconductor switch (118) connected to the inductor (109).

And, the current with the corrected power factor flows through a front stage output terminal (116) and flows to the input terminal of a rear stage.

Figure 3A:
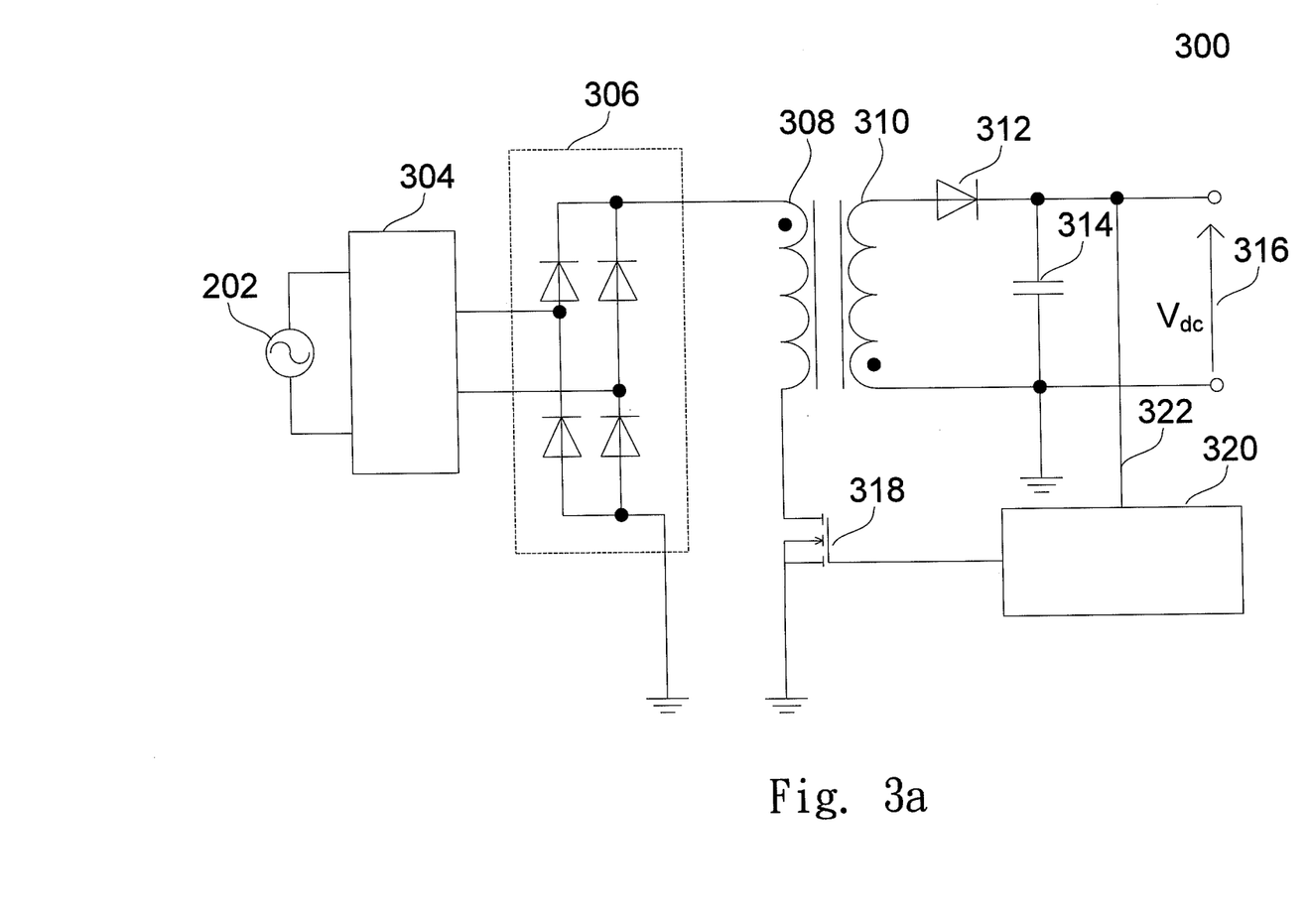
FIG. 3a illustrates the front stage of the non-contact transformer system according to another embodiment of the invention.

FIG. 3a illustrates the front stage of the non-contact transformer system according to another embodiment of the invention. The power factor correction circuit (111) of FIG. 1 is modified and the front stage of the non-contact transformer system of the invention is modified to a single stage AC/DC transformer with power factor correction, which increases the power factor and improves the system efficiency. That is, the transformer (300) is a transformer with power factor correction.

By referring to FIG. 3a, the non-contact transformer (300) includes: an electric magnetic interference filter (304) for filtering electromagnetic interference; a bridge rectifier (306) connected to the electric magnetic interference filter (304); a contact transformer connected to the bridge rectifier (306) and including a primary side inductor (308) and a secondary side inductor (310) for transforming a first current (alternating current) to a second current (direct current) with the decreased voltage and high power factor.

Further, the transformer (300) further comprises: a secondary side diode (312) connected to the secondary side inductor (310) in series; a secondary side capacitor (314) connected to the unity of the secondary side inductor (310) and the secondary side diode (312) in parallel; a feedback circuit (322) connected to the secondary side capacitor (314) a high voltage end; a front stage semiconductor switch (318) connected to the primary side inductor (308).

A controller (320), which is connected to the feedback circuit (322) and the semiconductor switch (318), controls the semiconductor switch (318) to turn on or turn off the primary side inductor (308) according to a signal returned from the feedback circuit (322).

The current with the power factor correction flows to a front stage output terminal (316).

Figure 3B:
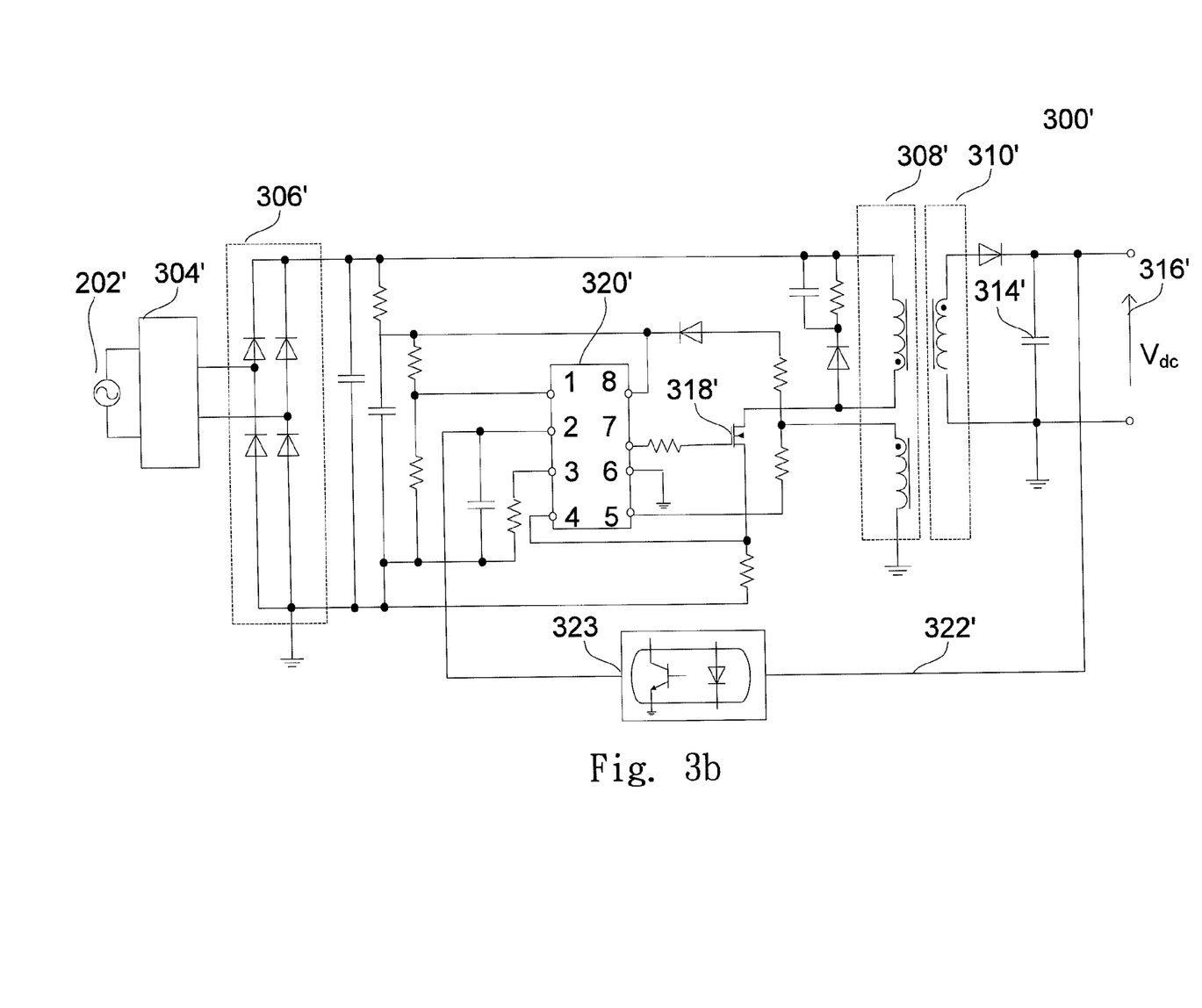
FIG. 3b illustrates a front stage of the non-contact transformer system according to another embodiment of the invention.

FIG. 3b illustrates a front stage of the non-contact transformer system according to another embodiment of the invention.

By referring to FIG. 3b, a transformer (300') of a non-contact transformer system comprises: an electric magnetic interference filter (304') for filtering electromagnetic interference; a bridge rectifier (306') connected to the electric magnetic interference filter (304'); a contact transformer connected to the bridge rectifier (306') and including a primary side inductor (308') and a secondary side inductor (310') for transforming a first current (alternating current) to a second current (direct current) with the decreased voltage and high power factor.

Furthermore, the transformer (300') further includes: a secondary side diode (312') connected to the secondary side inductor (310') in series; a secondary side capacitor (314') connected to the unity of the secondary side inductor (310') and the secondary side diode (312') in parallel; a feedback circuit (322'), of which an end is connected to a high voltage end of the secondary side capacitor (314'), and another end is connected to an optical coupler (323) for transporting a signal; a front stage semiconductor switch (318') connected to the primary side inductor (308').

The current with the power factor correction flows to a front stage output terminal (316').

A controller (320'), which is connected to the feedback circuit (322') and the semiconductor switch (318'), controls the semiconductor switch (318') to turn on or turn off the primary side inductor (308') according to a signal returned from the feedback circuit (322').

The controller (320') can be a single-stage flyback and boundary mode power factor correction controller for lighting, including: a FL6961 chip. Elements 1-8 shown in FIG. 3b are the port numbers in the FL6961 chip.

Figure 4A:
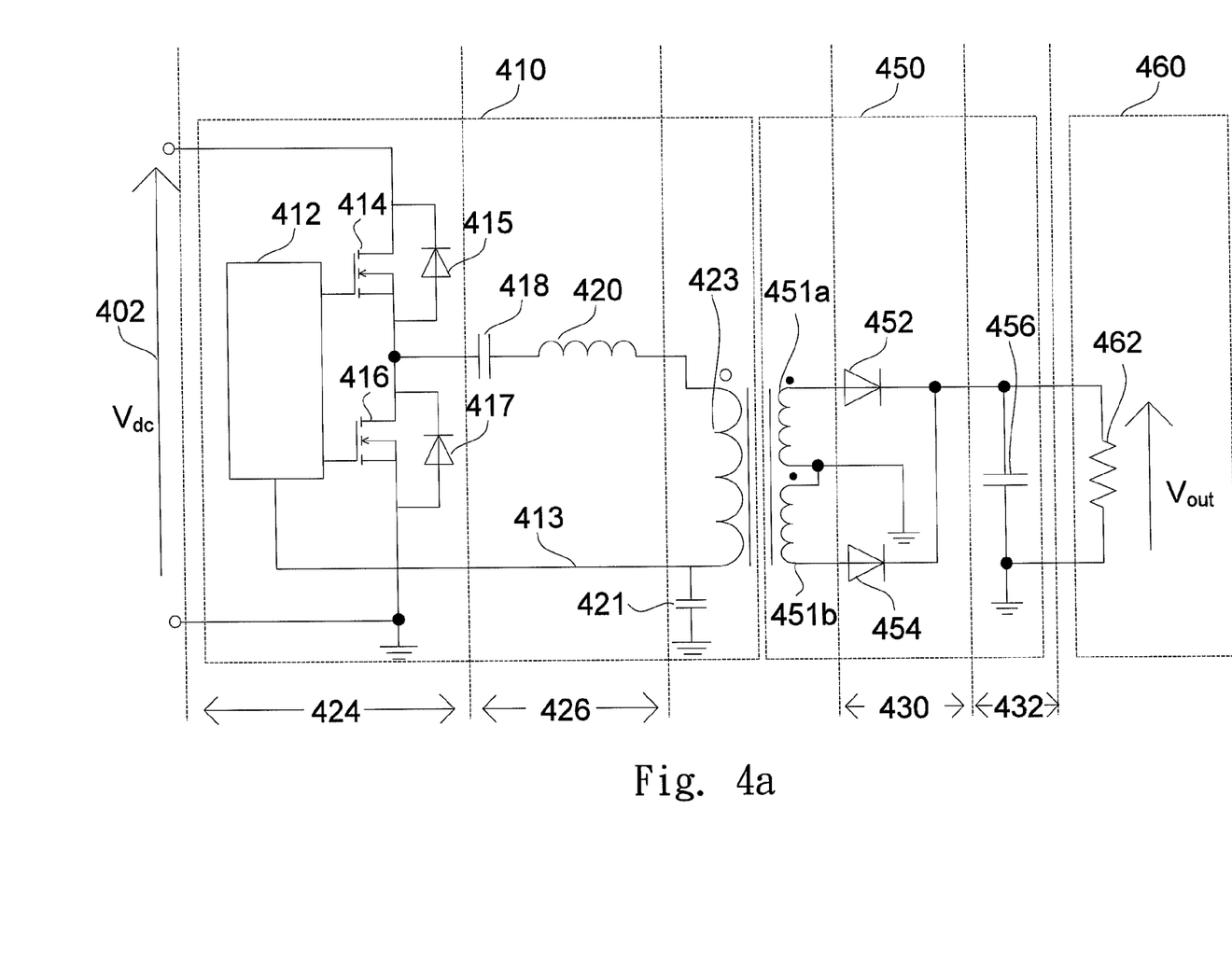
FIG. 4a illustrates a rear stage of the non-contact transformer system with a half bridge resonant circuit according to an embodiment of the invention.

FIG. 4a illustrates a rear stage of the non-contact transformer system with a half bridge resonant circuit according to an embodiment of the invention. The primary side transforms the voltage of the direct current output by the front stage to an alternating signal. After the energy transforming through the non-contact magnetic elements, the secondary side transforms the alternating signal to the direct current by the bridge rectifier and provides the direct current to the loading.

Figure 4B:
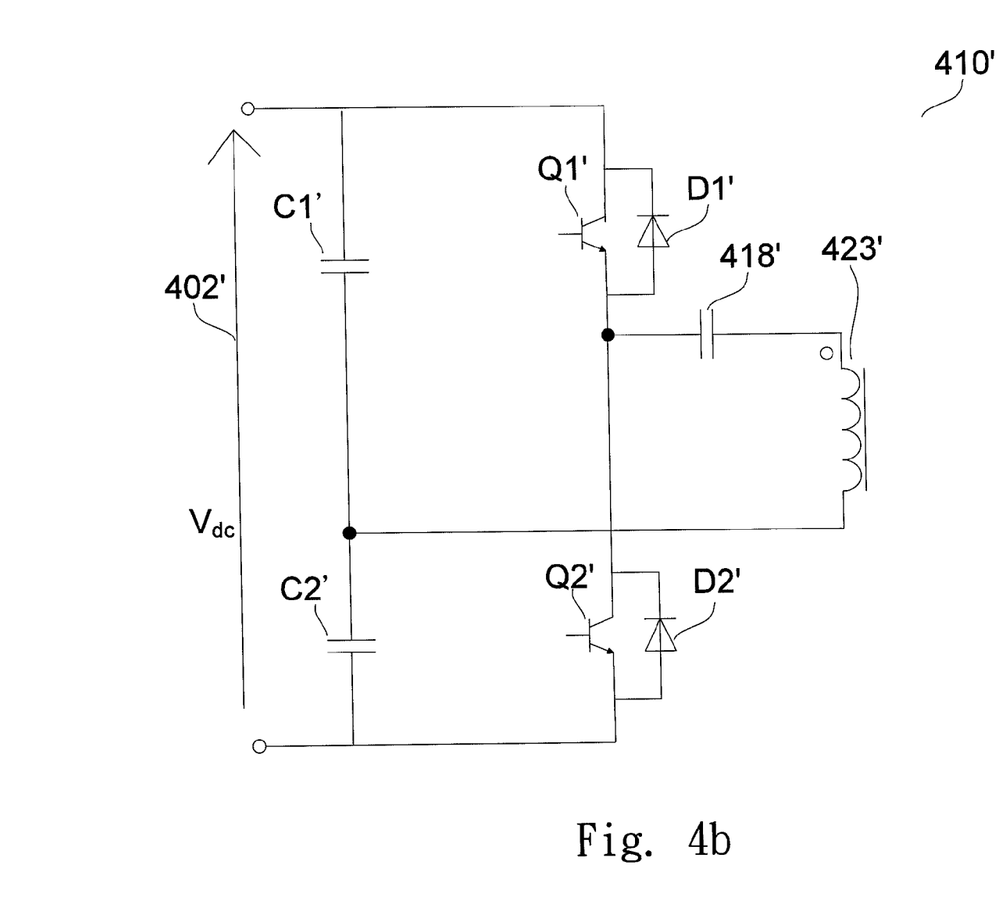
FIG. 4b shows the rear stage of the non-contact transformer system with the half bridge transforming circuit according another embodiment of the invention.
Figure 4C:
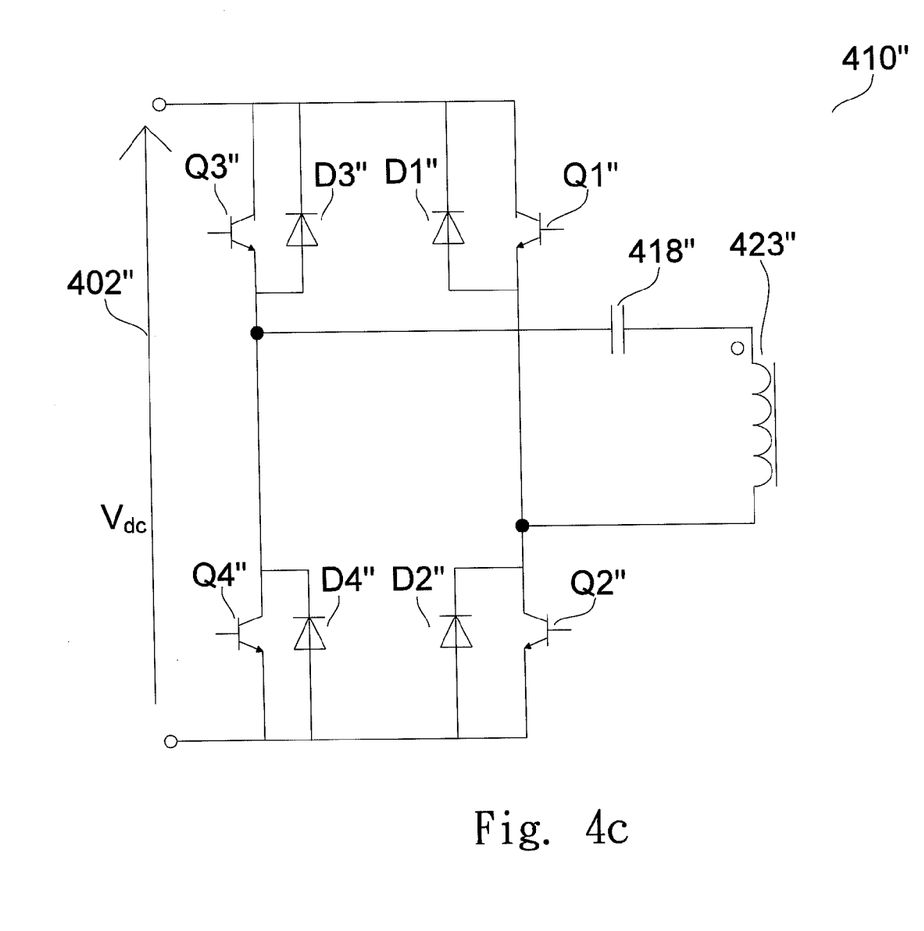
FIG. 4c shows a rear stage of a non-contact transformer system with a full bridge transforming circuit according another embodiment of the invention.

The current from the front stage output terminal (element 316 shown in FIG. 3a or element 316' shown in FIG. 3b) flows to the rear stage input terminal (element 402 shown in FIG. 4a, element 402' shown in FIG. 4b, element 402" shown in FIG. 4c).

The rear stage of the non-contact transformer system comprises: a transmitting circuit (410) connected to the transformer (element 300 shown in FIG. 3a or element 300' shown in FIG. 3b), and comprising: a half bridge resonator (412) for transforming the second current (direct current) to a third current (alternating current); and a transmitting inductor (423) for transforming the third current (alternating current) to a electromagnetic energy for wireless transmitting. The half bridge resonator (412) is connected to two rear stage semiconductor switches (414, 416), and two ends of each of the two rear stage semiconductor switches (414, 416) is respectively connected to a diode (415 or 417) to form a controlling switch circuit (424).

The transmitting circuit (410) of the primary side of the non-contact transformer further comprises a feedback circuit (413), of which an end is connected to the point between the transmitting inductor (423) and a ground capacitor (421), and another end is connected to the half bridge resonator (412).

The transmitting circuit (410) further comprises a resonant tank (426) including: a resonant capacitor (418) connected to the controlling switch circuit (424); and a resonant inductor (420) connected to the resonant capacitor (418).

The rear stage of the non-contact transformer system further comprises: a receiving circuit (450) including two receiving inductors (451a, 451b) for receiving the electromagnetic energy by the electromagnetic induction and transforming to a fourth current (direct current). An output circuit (460) is connected to the receiving circuit (450) for outputting the fourth current (direct current). The two receiving inductors (451a, 451b) are connected to two rectifying diodes (452, 454) to form a bridge rectifier circuit (430).

The bridge rectifier circuit (430) is connected to a low pass filtering circuit (432) including a low pass filtering capacitor (456). The controlling switch circuit (424) is controlled by resonance and frequency-modulation to be switched at zero current.

Thus, the rear stage is a non-contact driving circuit and a half bridge resonant circuit with frequency-modulation, which switches the elements in the primary side at zero voltage by the resonant theory. When the loading in the secondary side varies, the resonant curve in the primary side varies, and the operative frequency also varies. Thus, the operative frequency is optimum in any loading and resonant curve. The primary side switch can be switched at zero voltage and the secondary side rectifying element can be switched at zero current. Therefore, the loss of switching in the whole circuit can be reduced to improve the efficiency of the whole circuit.

FIG. 4b shows the rear stage of the non-contact transformer system with the half bridge transforming circuit according another embodiment of the invention. A transmitting circuit (410') is used to replace the transmitting circuit (410) shown in FIG. 4a to connect the transformer (300 or 300') shown in FIG. 3a or 3b. The transmitting circuit (410') comprises: a half bridge transforming circuit to transform the second current (direct current) to a third current (alternative current); and a transmitting inductor (423') to transform the third current (alternative current) to a electromagnetic energy to be transmitted wirelessly. The half bridge transforming circuit comprises: two rear stage capacitors (C1', C2'); and two rear stage semiconductor switches (Q1', Q2'), each of which has two ends connected to a diode (D1', D2') to form a controlling switch circuit.

FIG. 4c shows a rear stage of a non-contact transformer system with a full bridge transforming circuit according another embodiment of the invention. A transmitting circuit (410") is used to replace the transmitting circuit (410) shown in FIG. 4a to connect the transformer (300 or 300') shown in FIG. 3a or 3b. The transmitting circuit (410") comprises: a full bridge transforming circuit to transform the second current (direct current) to a third current (alternative current); and a transmitting inductor (423") to transform the third current (alternative current) to an electromagnetic energy to be transmitted wirelessly. The full bridge transforming circuit comprises: four rear stage semiconductor switches (Q1', Q2', Q3', Q4'), each of which has two ends connected to a diode (D1', D2', D3', D4') to form a controlling switch circuit.

Figure 5A:
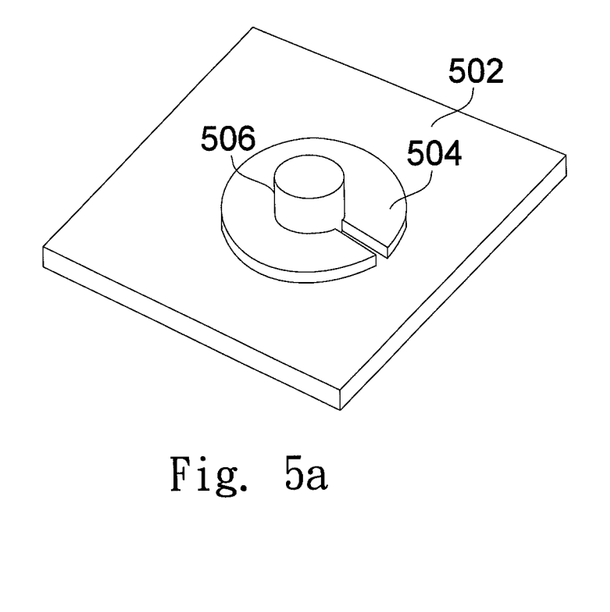
FIG. 5a shows a transmitting circuit according to an embodiment of the invention.
Figure 5B:
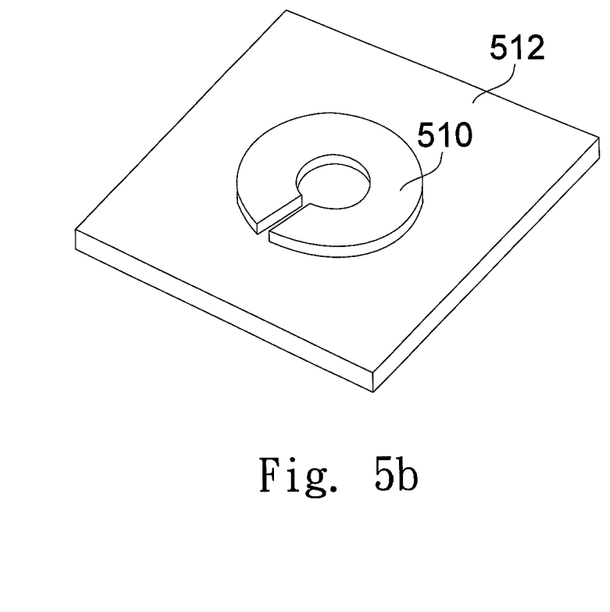
FIG. 5b shows a receiving circuit according to an embodiment of the invention.
Figure 6:
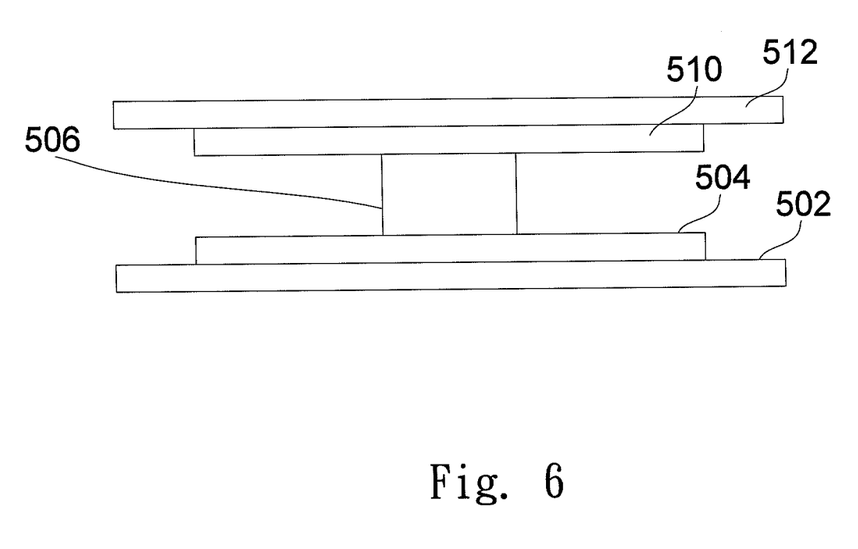
FIG. 6 illustrates the engaged condition of the receiving circuit and the transmitting circuit according to an embodiment of the invention.

FIG. 5a shows a transmitting circuit according to an embodiment of the invention, and FIG. 5b shows a receiving circuit according to an embodiment of the invention. FIG. 6 illustrates the engaged condition of the receiving circuit and the transmitting circuit according to an embodiment of the invention.

By referring to FIG. 5a, the transmit iron core (502) functions as the transmitting circuit (410) of FIGS. 2 and 4a. The transmitting inductor is an annular transmitting inductor (504), and the transmit iron core (502) comprises a pole (506) located in the center of the annular transmitting inductor (504).

By referring FIG. 5b, the receiving iron core (512) functions as the receiving circuit (450) of FIGS. 2 and 4a, and has a receiving inductor, i.e., an annular receiving inductor (510). When the annular receiving inductor (510) engages with the pole (506) and overlaps the annular transmitting inductor (504), the annular receiving inductor (510) receives the electromagnetic energy transmitted by the annular transmitting inductor (504).

The shapes of the pole (506) and the base part of the iron core can be: cylinder, cone, cuboid, or pyramid. The length of the pole (506) is enough to go through both coils of the annular receiving inductor (510) and annular transmitting inductor (504). The two coils perform the magnetic field conversion around the pole (506) of the transmit iron core (502), and the induction voltage of the receiving coil, i.e., the annular receiving inductor (510), can be increased to achieve high-flux conversion efficiency The receiving core (512) can be connected to an output circuit, which can be a loading including a charger, a lamp, and etc.

The above-described embodiments of the present invention are intended to be illustrative only. Numerous alternative embodiments may be devised by those skilled in the art without departing from the scope of the following claims.

What is claimed is:
1. A non-contact transformer system, comprising
an electric magnetic interference filter for filtering electric magnetic interference;

a bridge rectifier connected to the electric magnetic interference filter;

a transformer connected to the bridge rectifier, and comprising a primary side inductor and a secondary side inductor for transforming a first current to a second current with high power factor and lowering voltage;

a secondary side diode connected to the secondary side inductor in series;

a secondary side capacitor connected to an unity of the secondary side inductor and the secondary side diode in parallel;

a feedback circuit connected to a high voltage end of the secondary side capacitor;

a front stage semiconductor switch connected to the primary side inductor;

a controller connected to the feedback circuit and the semiconductor switch, and used for controlling the semiconductor switch to turn on or turn off the primary side inductor according to a signal returned by the feedback circuit;

a transmitting circuit connected to the transformer and comprising:

a half bridge resonator for transforming the second current to a third current, a transmitting inductor for transforming the third current to an electromagnetic energy to transmitting the electromagnetic energy wirelessly, and a feedback circuit with one end connected to a connecting point between the transmitting inductor and a ground capacitor and another end connected to the half bridge resonator;

a receiving circuit comprising two receiving inductors for receiving the electromagnetic energy by electromagnetic induction and transforming the electromagnetic energy to a fourth current; and an output circuit connected to the receiving circuit and outputting the fourth current;

wherein the half bridge resonator connected to: two rear stage semiconductor switches to form a controlling switch circuit; and a resonant tank comprising:

a resonant capacitor connected to the controlling switch circuit; and a resonant inductor connected to the resonant capacitor.

2. The system of claim 1, wherein the two receiving inductors are connected to two rectifying diodes to form a bridge rectifier circuit.

3. The system of claim 1, wherein the controlling switch circuit is controlled by resonance and frequency-modulation to switch the controlling switch circuit in zero voltage, and switch the bridge rectifier circuit in zero current.

4. The system of claim 1, wherein the first current and the third current are alternating currents, and the second current and the fourth current are direct currents.

5. The system of claim 1, wherein the transmitting inductor of the transmitting circuit is an annular transmitting inductor, and the transmitting circuit further comprises a pole in center of the annular transmitting inductor; and the two receiving inductors of the receiving circuit form an annular receiving inductor, wherein when the annular receiving inductor engages with the pole and overlaps the annular transmitting inductor, the annular receiving inductor receives the electromagnetic energy transmitted by the annular transmitting inductor, wherein the pole has a length enough to go through both of the annular transmitting inductor and the annular receiving inductor.

6. The system of claim 1, wherein the transformer is a power factor correcting transformer.

* * * * *